W. G. LAIRD.
PROCESS OF PURIFYING LIQUIDS.
APPLICATION FILED NOV. 20, 1916.
1,320,396.
Patented Nov. 4, 1919.
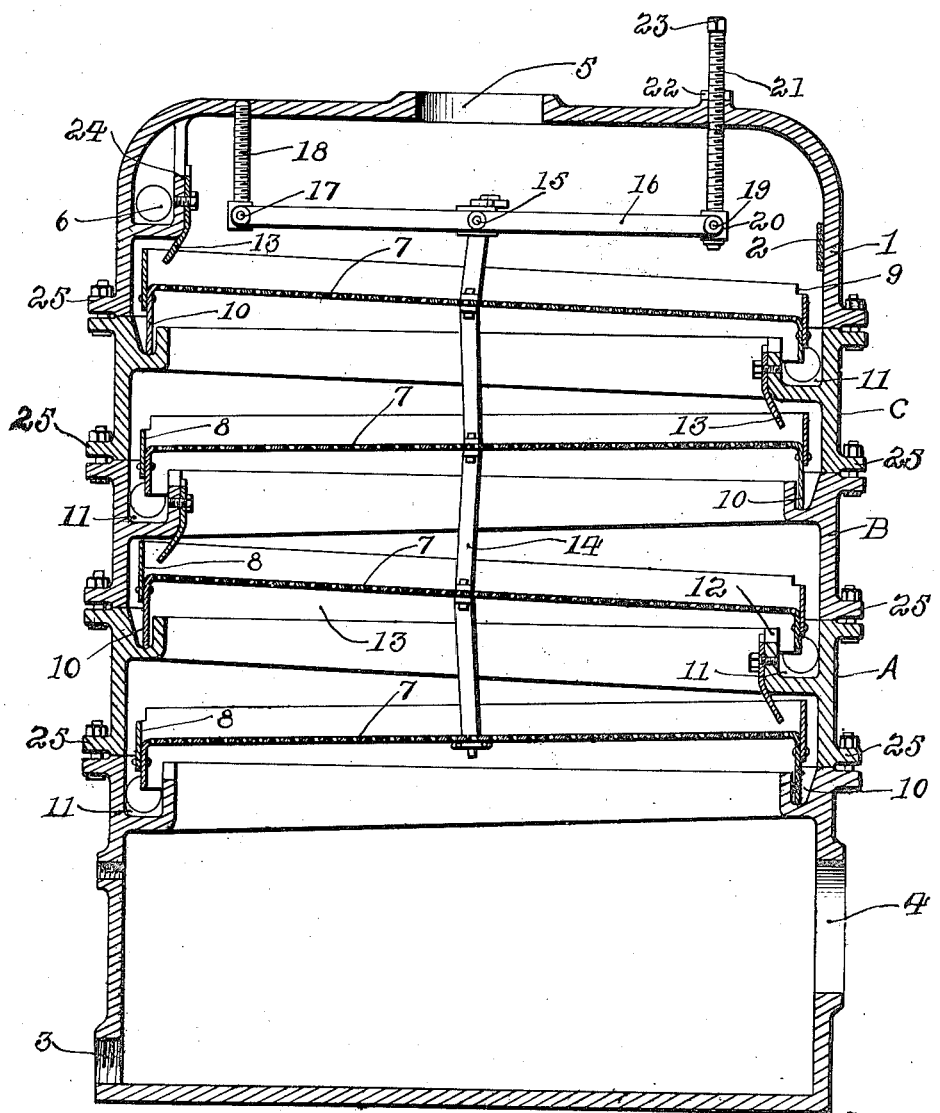

UNITED STATES PATENT OFFICE.

WILBUR G. LAIRD, OF NEW YORK, N. Y., ASSIGNOR TO HENRY L. DOHERTY, OF NEW YORK, N. Y.

PROCESS OF PURIFYING LIQUIDS.

1,320,396.   Specification of Letters Patent.   Patented Nov. 4, 1919.

Application filed November 20, 1916. Serial No. 132,392.

*To all whom it may concern:*

Be it known that I, WILBUR G. LAIRD, a citizen of the United States, residing at New York, in the county of New York and State of New York, have invented certain new and useful Improvements in Processes of Purifying Liquids, of which the following is a specification.

This invention relates to processes of purifying liquids; and it comprises a method of producing intimate, uniform and thorough contact of two immiscible liquids for the purpose of purifying one such liquid wherein the two liquids are caused to travel against each other in a vertical chamber in such manner that the lighter liquid passing upward passes through successive layers of the heavier liquid as small spaced drops or droplets; all as more fully hereinafter set forth and as claimed.

There is occasion in many arts to produce an intimate and uniform contact of a pair of immiscible liquids; as in purifying the various petroleum oils with sulfuric acid, either the common oil of vitriol or the fuming acid; the subsequent washing of such oil with water or with alkali solutions, as the case may be; the purification of resin solutions with alkalis; the washing of carbon bisulfid, etc. In all such operations the amount of action per time unit depends very largely upon the surface of contact between the two liquids; and since this surface with two quiescent bodies is relatively small, it is necessary in the usual methods to use violent agitation of one kind or another. In purifying oils with sulfuric acid, for instance, in the ordinary "treating" operation the oil and sulfuric acid are sometimes agitated together violently by the aid of paddles of iron, lead or various alloys. More frequently agitation is by sending a blast of air through the mixture. The contacting of any two immiscible liquids by mechanical agitation, is irregular and uncertain; the way the two liquids stir up together and intermix depends very largely upon their relative volumes, the shape and dimensions of the treating vessel, their mutual emulsifying power and other factors. For sulfuric acid treatment of oils the use of air blast stirring is almost universal; but not only is it irregular in its action, but it has the further disadvantage of carrying forward vapors. Sulfuric acid is reduced more or less with the production of $SO_2$ which is carried forward and is apt to create a nuisance and, on the other hand, volatile oils are, or may be, lost with the effluent gases. Undesired oxidizing influences are at times incident to the use of air.

For this irregular type of agitation in the present invention I substitute a simple, positive and direct contact between the two liquids in a way which may be made continuous. I have found that if a structure of much the type of an ordinary cup-and-plate column still be employed, and the lighter liquid introduced at the base of such structure, the lighter liquid can be made to penetrate and pass through successive isolated layers of the heavier, each passage being in a multiplicity of very fine drops or droplets, offering, in the aggregate an enormous surface of contact between the two liquids. After each passage the dispersed droplets are reunited in a body of liquid which is again subdivided in furnishing the drops for the next passage. In this manner of operating not only is the contact area large but the contact is positive in its nature. A lighter liquid introduced below the bottom of a uniformly perforated plate covered with a layer of heavy liquid of uniform depth, as I have found tends to pass very uniformly through each of the perforations of the plate. And in the stated structure by providing means whereby the heavier liquid may be passed down successively from plate to plate, that is, means other than the stated orifices, the two liquids may be effectively contacted on counter-current principles. With perforations of uniform size in the plate, the amount of light liquid going through each perforation is substantially the same as that going through any other perforation. The lighter liquid, so to speak dams up below each plate and, with holes in the plate of the kind stated, it passes through in substantially the same amount in each hole. All the holes function uniformly with production of myriads of succeeding rising drops, rising from every part of the plate and penetrating and passing through the heavy liquid layer thereon. The plates may be level, although they need not be absolutely so; in fact, where the counter-current principle of washing is used, it may be an advantage to have them somewhat tilted from the horizontal to more nearly conform to the hydraulic gradient of the heavier liquid thereby producing a more nearly uniform depth of the liquid. Under the circumstances stated, the heavier liquid above the plate exhibits no tendency to pass downward through the holes. Special conduits are provided to allow the heavier liquid to pass downward from plate to plate. The heavy liquid may therefore constitute a moving or flowing layer, its direction of travel being in a different direction from the movement of the drops of the light liquid through it. The light liquid drops pass through the heavier liquid at substantially right angles.

In the described method the subdivision and distribution of the lighter liquid through the heavier liquid is uniform and intimate. And using the countercurrent principle and producing a steady downward flow of the heavier liquid through the apparatus against the upward flow of light liquid; the utilization of the purifying action of the one liquid on the other is substantially complete.

In the accompanying illustration I have shown, more or less diagrammatically, certain apparatus useful for the described purpose. In this showing the figure is a view, in vertical section, of an apparatus for the purpose stated.

The apparatus may be made of any suitable material. For treating oil with sulfuric acid it may, for instance, be of white cast iron, high silicon iron or one of the other acid-resistant ferrous materials, or it may be constructed of or lined with lead, resistant alloys, etc. For washing carbon bisulfid, it may be of iron, copper or even wood. The nature of the material to be treated will dictate the materials of construction. I shall here describe it as adapted for the use of sulfuric acid on oils. As so constructed, 1 is a casing of rectangular or cylindrical section. As fragmentarily shown, it may be lined with a protective lining 2 using, for instance, lead. At its base it is provided with heavier liquid outlet 3 and light liquid inlet 4. At its top it is similarly provided with light liquid outlet 5 and heavier liquid inlet 6. Within this casing is a series of horizontal or inclined partitions 7, each uniformly perforated with fine holes. As shown, each of these plates is provided with an upper rim 8, making it, in a way, pan-like. In one end of the plate, which is the lower end in use, the pan-like rim is provided with a depression 9 over which the heavy liquid may flow. Below the plate it is, as shown, provided with another flange-like element 10. As shown, this flange rests in a trough-like or gutter element 11. As shown, the flange rests on the bottom of this gutter at one end while at the other end it is spaced somewhat above the gutter bottom. This permits an up and down motion, or level adjustment, of the plate which swings on the portion of the lower flange resting in the gutter at the upper end. As shown, this gutter element is provided with a depression 12 forming a low point over which heavy liquid may flow. This heavy liquid so flowing is directed on the next plate below by means of plate 13. As shown, these devices are on alternate sides between pairs of plates. The series of plates as a whole may be adjusted in angle by means of a special device consisting of a linked rod 14 connected to each plate and passing upward to a pivot 15 on a horizontal arm 16. This horizontal arm is pivoted at 17 to rod 18 while at the other end it is connected to a pivot 19 to threaded socket 20 on adjustable, vertical rod 21, shown as screw threaded through the top of the casing at 22. By applying a wrench to squared end 23 this threaded rod may be moved up and down thereby changing the angles of the plates. The openings in the trough 11 may be normally closed but may be used to drain the troughs when desired.

By allowing heavy liquid to enter at 6 it overflows dam 24 and is directed by the plate 13 on the higher end of the first plate. Over this plate it flows to the lower end where it similarly overflows and passes down into the gutter-like element. In this gutter-like element it gives a liquid seal with the aid of the lower flange 10. It flows in like manner over all the plates of the series until it goes to outlet at 3. The light liquid introduced at 4 passes upward, fills the casing and forms a layer beneath the bottom of each successive plate. It flows through each of the perforations of any given plate uniformly and is thereby divided into a multiplicity of separate drops passing through the layer of heavy liquid on the top of the plate. The light liquid finally goes through outlet 5 to a suitable place of storage or use.

The casing is advantageously made as shown of a number of sections A, B and C, flanged and bolted together at 25.

In the use of the above structure, the relative proportions of the two liquids may be varied. For instance, in treating oil with sulfuric acid, the major portion of the liquid in the apparatus may be oil and indeed as a rule it is better to confine the amount of the heavier liquid in the apparatus to the amount which is necessary to furnish the described flowing thin layers. Nevertheless the proportions may be reversed and the casing filled with the heavier liquid while the amount of light liquid is confined to that necessary to form a layer beneath the plates. Variations of the relative amounts of the two liquids do not interfere with the perfection of their contact.

Presuming the apparatus is treating oil, sulfuric acid being introduced at 6 and removed at 3, it is obvious that a uniform, perfect opportunity for contact between the oil and the acid is afforded and that the oil may be effectively purified with the minimum amount of sulfuric acid.

More than two immiscible liquids may be simultaneously contacted in the described apparatus, as by feeding in two heavy liquids at the upper inlet. These separate into two superimposed flowing layers through which the lighter liquid passes as before.

Also two or more heavy liquids may be employed in series and in the same apparatus by drawing off the upper heavy liquid from one of the gutter seals and introducing another heavy liquid in the next lower overflow gutter. In this method of operation, the perforated plate lying between the two points of outlet and inlet for liquids does not function, and may be omitted.

What I claim is:—

1. The process of producing purifying actions between immiscible liquids of differing specific gravities which comprises passing the lighter liquid through a plurality of isolated thin flowing layers of the heavier liquid in the form of a multiplicity of fine drops.

2. The process of producing purifying actions between immiscible liquids which comprises maintaining a thin moving layer of the heavier liquid and passing the lighter liquid through this moving layer in the form of drops and in a different direction from the movement of the layer without mixing the liquids.

3. The process of producing purifying actions between immiscible liquids of differing specific gravities which comprises passing the lighter liquid through a plurality of spaced horizontal flowing layers of the heavier liquid as a multiplicity of fine drops, the drops passing through a lower layer being reunited prior to passing through the next succeeding layer as such multiplicity of drops.

4. The process of producing purifying actions between immiscible liquids of differing specific gravities which comprises passing a heavier liquid down through a columnar chamber as a plurality of spaced flowing substantially horizontal layers spanning such chamber while passing a lighter liquid upward through such chamber in such manner as to compel it to pass through each successive layer as a plurality of drops.

5. The process of producing purifying actions between immiscible liquids of differing specific gravities which comprises flowing a heavier liquid downward through a columnar chamber provided with perforated plates spanning and serving to support horizontal flowing layers of such heavy liquid and passing a lighter liquid into such chamber below a lower plate while removing it above an upper plate, without mixture of the two liquids.

6. In the purification of liquids the process which comprises passing one liquid through a moving layer of another liquid in the form of drops, the direction of passage being at substantially right angles to the line of movement of said body of liquid.

7. In the purification of liquids the process which comprises maintaining a relatively thin layer of liquid over a body of lighter liquid and passing the lighter liquid in the form of drops through the relatively thin layer of heavier liquid.

In testimony whereof, I affix my signature.

WILBUR G. LAIRD.

Witnesses:
Gray J. Houston,
Lester M. Jones.